US011169509B2

(12) United States Patent
Cole et al.

(10) Patent No.: US 11,169,509 B2
(45) Date of Patent: Nov. 9, 2021

(54) EXCEPTION HANDLING FOR ROBOT ASSISTED PRODUCT MANAGEMENT

(71) Applicant: ABB Schweiz AG, Baden (CH)

(72) Inventors: Gregory A. Cole, West Hartford, CT (US); Carlos W. Morato, Sammamish, WA (US)

(73) Assignee: ABB Schweiz AG, Baden (CH)

( * ) Notice: Subject to any disclaimer, the term of this patent is extended or adjusted under 35 U.S.C. 154(b) by 294 days.

(21) Appl. No.: 16/365,244

(22) Filed: Mar. 26, 2019

(65) Prior Publication Data
US 2020/0310391 A1    Oct. 1, 2020

(51) Int. Cl.
*G05B 19/418*     (2006.01)
*B25J 9/16*     (2006.01)
*B25J 11/00*     (2006.01)

(52) U.S. Cl.
CPC ........ *G05B 19/4184* (2013.01); *B25J 9/1674* (2013.01); *B25J 11/008* (2013.01); *G05B 19/4183* (2013.01)

(58) Field of Classification Search
CPC ............ G05B 19/4183; G05B 19/4184; G05B 2219/40164; G05B 2219/40153;
(Continued)

(56) References Cited

U.S. PATENT DOCUMENTS 6,996,538 B2    2/2006  Lucas
9,384,443 B2    7/2016  Passot et al.
(Continued)

FOREIGN PATENT DOCUMENTS

CN           107186706 A      9/2017
KR           101398215 B1  *  5/2014    .............. B25J 18/00
WO      WO 2018/146687 A1   8/2018

OTHER PUBLICATIONS

Agency for Science, Technology and Research, "A new class of collaborative robots may be the future of industrial remanufacturing," 4 pp. (Aug. 24, 2016), downloaded from the Internet at https://phys.org/news/2016-08-class-collaborative-robots-future-industrial.html on Oct. 9, 2018.

(Continued)

*Primary Examiner* — Khoi H Tran
*Assistant Examiner* — Tanner L Cullen
(74) *Attorney, Agent, or Firm* — Leydig, Voit & Mayer, Ltd.

(57) ABSTRACT

A robotic unit for manipulating items and products may receive assistance from a product management system if an exception occurs indicating the robotic unit cannot complete a given task with respect to handling the product. The product management system may be associated with a plurality of different assistance centers and response centers providing different types or levels of assistance. The product management system can classify the exception according to hierarchal tiers to determine the type of assistance required. The product management system can then generate and direct an intervention request to one of the response centers based on the classification. The assistance and response centers may be equipped and staffed to provide particularized assistance to the robotic unit. In an example, the robotic unit may store data and instructions received from the assistance and response center for future implementation.

20 Claims, 3 Drawing Sheets

(58) Field of Classification Search
CPC .......... G05B 2219/39212; B25J 9/1689; B25J 11/008; B25J 9/1671; B25J 9/1674; B25J 9/1679; G05D 2201/0216
See application file for complete search history.

(56) References Cited

U.S. PATENT DOCUMENTS

| | | |
|---|---|---|
| 9,656,387 B2 | 5/2017 | Mian |
| 9,956,687 B2 | 5/2018 | Florencio et al. |
| 10,564,031 B1* | 2/2020 | Stoia ...................... B25J 9/1671 |
| 2014/0180479 A1* | 6/2014 | Argue ................... B25J 9/0093 |
| | | 700/259 |
| 2017/0144301 A1 | 5/2017 | Wahizu et al. |
| 2018/0147721 A1 | 5/2018 | Griffin et al. |
| 2018/0165518 A1* | 6/2018 | Assaf ................. G06K 9/00671 |
| 2018/0215039 A1* | 8/2018 | Sinyavskiy .......... G05D 1/0274 |
| 2018/0270412 A1 | 9/2018 | Kanda et al. |
| 2018/0284760 A1* | 10/2018 | Gupta .................... B25J 13/006 |
| 2019/0202053 A1* | 7/2019 | Tan ........................ B25J 9/1671 |

OTHER PUBLICATIONS

Copeland, "Artificial Intelligence," *Britannica Online*, 20 pp. (Oct. 9, 2018) downloaded from the Internet at https://www.britannica.com/technology/artificial-intelligence on Oct. 9, 2018.

* cited by examiner

EXCEPTION HANDLING FOR ROBOT ASSISTED PRODUCT MANAGEMENT

BACKGROUND

Robots have become prevalent in many fields to automate certain tasks that have traditionally been performed by humans. Robots are capable of performing a range of motions and movements to manipulate their surrounding environment when performing these tasks and may possess a certain degree of control or intelligence that enables the robot to recognize and make corrections or adjust its actions in the event it encounters unanticipated difficulties. Accordingly, robots may be capable of semi-autonomous or fully autonomous operation. One area where robots may become more frequently prevalent is in handling, manipulating, and moving items located in the surrounding environment. An example of this activity may be in a retail store where a robot may be used to restock and replenish products or goods from inventory to shelves or floor locations where the items are available for selection and purchase by customers. The present disclosure is directed to the use of robots for such purposes.

SUMMARY

A system and method can provide assistance to a robotic unit attempting to manipulate items such as, for example, products in a retail facility. The robotic unit may generate an exception signal indicating the robotic unit cannot complete a task with respect to the product. The system and method may classify the exception signal to determine the type of assistance appropriate for the robotic unit. For example, the exception may be classified according to one or more of a product identification exception, a product location exception, and a computational exception. The system and method may generate and direct an intervention request to a center equipped and/or staffed to assist the robotic unit with completing the task according to the classification.

DETAILED DESCRIPTION

Figure 1:
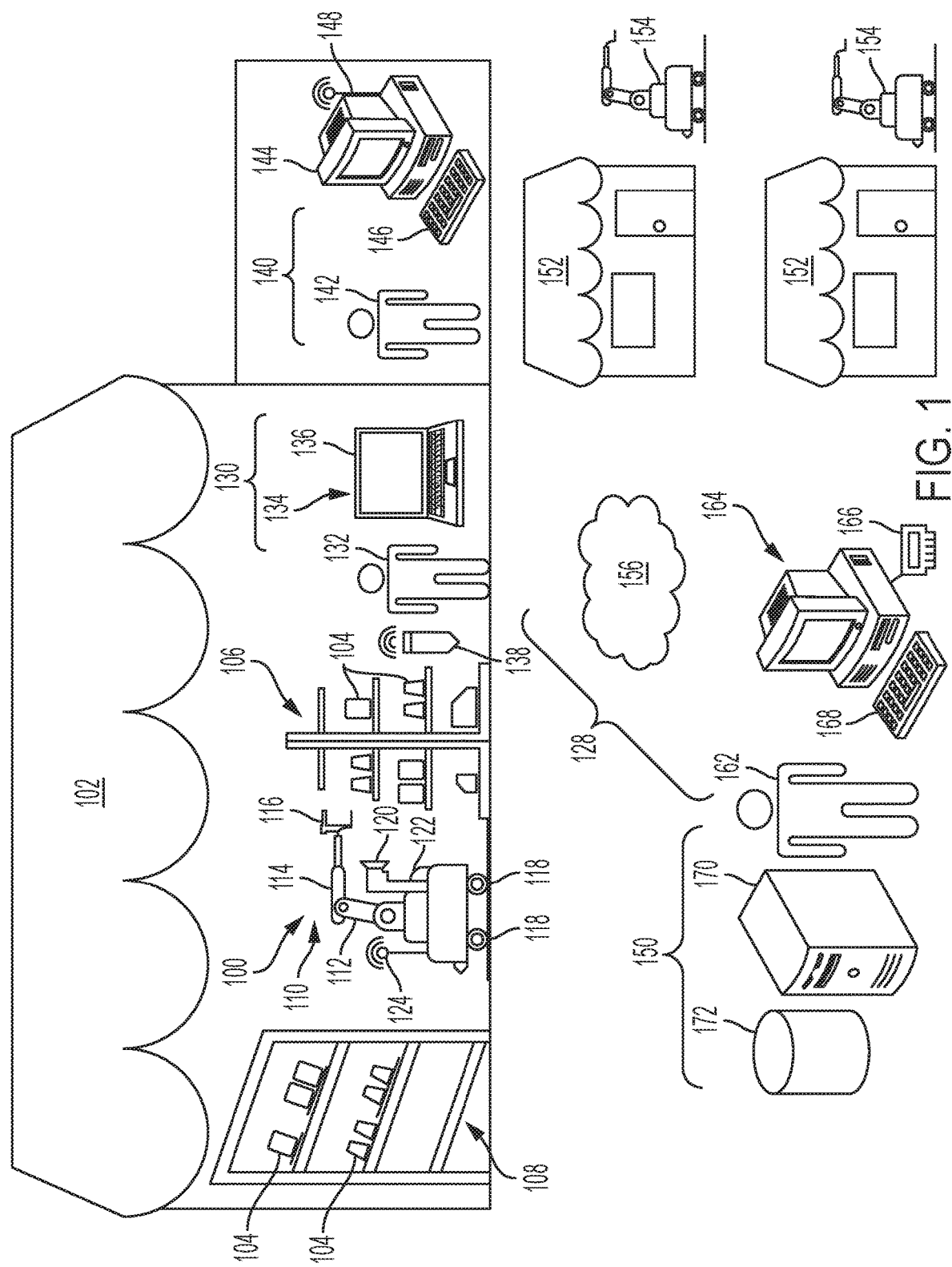
FIG. 1 is a schematic diagram representative of a semi-structured environment such as, by way of example, a retail store where a robotic unit may operate in conjunction with a product management system to manipulate and move items about the store.

Now referring to the drawings, wherein like reference numbers refer to like elements, there is illustrated in FIG. 1 an example of an environment in which a robotic unit 100 may be used to manipulate and handle various items by automatically conducting a series of complex actions. The environment may be a semi-structured environment in which obstacles, items, and tasks are generally well defined, organized, and predetermined but in which exceptions to the ordered structure might occur. The illustrated environment may include a physical facility 102 in which the robotic unit 100 interacts with various products 104 and performs various tasks. As an example, the facility 102 may be a retail facility or retail store where customers or end users may shop for, select, and purchase retail goods and products 104 for consumption. By way of example, these products 104 may be groceries and convenience products, shopping products such as clothes or books, specialty products, or any other suitable type of consumer items. Hence, the products 104 may be intended as final products for end consumption as differentiated from intermediate products used in the production of further products and goods. In accordance with the disclosure, however, the facility may be of another type such as a warehouse or distribution facility, a manufacturing facility for producing products and goods, a library, a hospital, or any other suitable example of a facility in which a robotic unit might interact with various types of items and products.

In the example of a retail facility 102, the products 104 may be placed in predetermined product locations 106 such as shelving units, bins, counters, or floor locations for inspection and selection by consumers. Moreover, in the retail example, a wide variety of different products 104 may be made available for selection. The products 104 may take various configurations, sizes, shapes, weights, and the like. In addition to the product locations 106, the retail facility 102 may also include a stockroom 108 or backroom in which additional products 104 are stored for future display and sale. A task the robotic unit 100 may be used for is to restock or replenish the product locations 106 as they are depleted with products 104 from the stockroom 108. Other tasks may include moving products 104 between product locations 106 or reorganizing the products 104 at the product locations 106. The robotic unit 100 may also be used to remove products 104 that have become damaged or expired.

To manipulate and interact with the products 104, the robotic unit 100 can include a product manipulation tool 110. An example of a product manipulation tool 110 is a robotic arm 112 which includes articulating or rotating joints to enable movement in various degrees of freedom and/or along various axes to move with respect to the stationary product 104. The robotic arm 112 is therefore able to pick, lift, move and/or set the products 104. The robotic arm 112 may be actuated by electric motors, pneumatics, hydraulics, and/or other servomechanisms. To physically contact the products 104, the robotic unit 100 can include a product retrieval tool 114, also referred to as an end effector, disposed at the distal end of the robotic arm 112. The product retrieval tool 114 may be a jaw-like gripper and may include bifurcated first and second gripper fingers 116 that are opposed to and spaced apart from each other. In operation, the gripper fingers 116 can be operatively associated with an actuator to close the fingers and clamp about a product 104. Examples of other types of product manipulation tools 110 or product retrieval tools 114 include those that attach to products 104 through attractive forces such as magnetic forces, electrostatic forces, vacuum suction, or by use of adhesives. To navigate about the retail facility 102, the robotic unit 100 may be a mobile unit and may include wheels 118 or other propulsion systems such as continuous tracks, moveable or linked legs, or may move along tracks or rails or by an overhead gantry system. In other examples, the robotic unit 100 may have another configuration such as a wheeled dolly or a drone, or the robotic unit may be a stationary unit in a fixed location.

To gather information about the surrounding environment, including the retail facility 102 and products 104 therein, the robotic unit 100 can be operatively associated with one or more sensory devices 120. An example of a sensory device 120 can be a camera or other optical sensor for capturing visual images of the surrounding environment. The camera may be sensitive to light in the visual spectrum or to radiation in other spectrum ranges such as infrared. Other examples of sensory devices 120 may include LIDAR, radiofrequency sensors, motion sensors, inertial measurement units, audio sensors, magnetic sensors, GPS, and the like. To interface with the robotic unit 100, the robotic unit may be operatively associated with input/output devices 122 such as keypads or keyboards, touchscreens, visual displays, and the like. To further interface with the robotic unit 100 through wireless communication, the robotic unit may include a transmitter/receiver 124 such as an antenna. The transmitter/receiver 124 can communicate through short range radio waves propagating through the environment, such as through the Bluetooth protocol. The transmitter/receiver 124 may also communicate through other mediums such as optical or acoustic. The robotic unit 100 may also or may instead be adapted to communicate through wired or hard-lined communication, such as through the exchange of electrical or optical signals over electrical conductors or fiber optic waveguides.

To assist the robotic unit 100 with navigating about the facility 102 and manipulating the products 104, the robotic unit 100 can be operatively associated with a management system or control system. For example, the robotic unit 100 can be configured for autonomous or semi-autonomous performance of various tasks with respect to the surrounding environment and products 104 therein, but may cooperate with the management system for assistance in performing certain tasks or providing assistance or information with other aspects of the system. In the example of the retail facility 104, the management system may consist of or be associated with a product management system 128, such as an inventory control system, to assist the robotic unit 100 in interacting with the products 104. In the illustrated example, the product management system 128 may be a distributed system which is associated with a plurality of different service centers that provide different types or levels of support and assistance to the robotic unit 100, although in other examples, the product management system may have a more centralized or hierarchical processing schema. The product management system 128 can also enable a human user assigned to or associated with the various service centers to interact, via computer systems, with the robotic unit 100 to provide the different types or levels of assistance through human input.

For example, some types of assistance may be rendered through direct interaction with the robotic unit 100 and, accordingly, a service center such as a data assistance center 130 may be located at the retail facility 102 and may be considered on-the-floor or in-store. The data assistance center 130 may be staffed or managed by an employee of the retail facility 102 such as a clerk 132 or assistant who may be trained to directly interact with the robotic unit 100 with respect to the products 104 in the retail facility 102. To facilitate interaction, the data assistance center 130 can also be operatively associated with a data assistance system 134. The data assistance system 134 can be a laptop or notebook type computer 136 that is portable and may be carried about the retail facility 104 to the location of the robotic unit 100. Another example of a data assistance system 134 may be a handheld unit 138 that can communicate with the robotic unit through short range wireless communication. In other examples, the data assistance system 134 may be a tablet-type computer or may be associated with a recharging station at the retail facility 102 for periodic recharging of the robotic unit 100. In another example, the clerks 132 may provide data assistance through the input/output devices 122 on the robotic unit 100.

In addition to or instead of the data assistance center 130, the product management system 128 can be associated with a first response center 140 which, in the illustrated example of a retail environment, may be located onsite at the retail facility 102 at, for example, a backroom or office and hence is off-the-floor. In other examples, the data assistance center 130 and the first response center 140 may share a physical presence and differ in the types of assistance rendered to the robotic unit 100. The first response center 140 may be staffed or managed by other employees of the retail facility 102 such as managers or technicians 142, who may also be trained to interact with the robotic unit 100 to provide the assistance and services associated with the first response center 140. To facilitate interaction, the first response center 140 may also be associated with a first response computer system 144 that can be in the form of a personal computer or workstation. The first response computer system 144 can have input/output devices 146 that enable the technician 142 to interact with the robotic unit 100. Examples of input devices include keyboards, mice, and a joystick. Examples of output devices include visual displays, printers, and speakers. To establish wireless communication between the robotic unit 100 and the first response center 140, the first response computer system 144 can include a transmitter/receiver 148 that can exchange information via radio waves or otherwise with the transmitter/receiver 124 on the robotic unit 100. In other examples, communication may occur through wired links or pathways.

The product management system 128 can also be associated with a second response center 150 that, in the illustrated example of a retail environment, may be located offsite or remote from the retail facility 102. In other examples, the second response center 150 may be onsite and may share a physical presence with the data assistance center 130 and/or the first response center 140 and differs in the type of assistance rendered to the robotic unit 100. By way of example, the product management system 128 may be an enterprise wide network that connects the retail facility 102 with different locations within the same business or organization through the second response center 150. As another example, the second response center 150 may be associated with an outside consultant or outsourcing vendor to service the retail facility 102 and other locations within the organization. The other locations may be additional retail facilities 152 that may include additional robotic units 154 to interact with various products and items at those facilities. Communication between the retail facilities 102, 152 may be directly or indirectly routed through the second response center 150. For example, the product management system 128 can be operatively associated with a network 156 through which the retail facilities 102, 152, the data assistance center 130 and the first and second response centers 140, 150 can exchange information and cooperate with each other. The network 156 can utilize any suitable networking technology and may utilize public resources such as the worldwide web or it can be a private network. The network 156 can be configured with any suitable architecture such as client-server or peer-to-peer and may have any suitable layout or topology. The physical communication links can be line connections such as conductive hardwired connections or fiber optic connectors, wireless connections such as through radio waves, or a combination of wired and wireless links. The network 156 can utilize any suitable communication protocol to exchange information using digital or analog signals.

The second response center 150 may be staffed by individuals such as software developers, engineers, technical consultants, or computer programmers 162. To access and interact with the product management system 128, the second response center 150 can also include one or more second response computer systems 164 which may be a personal computer or workstation linked to and in communication with the network 156 via a network link such as a modem or network interface card 166. The second response computer system 164 can have input/output devices 168 to interface with the programmers 162 such as keyboards, mice, displays, and similar peripheral devices. To provide additional computing power and resources for the product management system 128, the second response center 150 can also include additional hardware such as one or more servers 170, which may be mainframes or minicomputers having significant processing capabilities. To store and organize the data and information utilized by the product management system 128, the server 170 may be operatively associated with a large-scale data storage 172 or a data center, which may support various databases or data drives and which may utilize any suitable computer readable medium such as electronic, magnetic, or optical storage.

A possible advantage of the distributed architecture or design of the product management system 128 illustrated in FIG. 1 is that a plurality of different assistants and response centers can provide support and assistance to the robotic unit 100 as it performs tasks with respect to the products 104. Moreover, the data assistance center 130, the first response center 140, and the second response center 150 can each be configured, equipped, and staffed to provide different levels or types of assistance, for example, based in part on their location, interaction, or connectivity with respect to the robotic unit 100. For example, the data assistance center 130, because of its location on the floor of the retail facility 102, may be configured to provide first-tier support with respect to the products 140 available at the facility through direct interaction with the robotic unit 100. The clerks 132 may likewise be appropriately trained to directly interact with the robotic unit 100 within the retail environment, for example, with respect to different product locations 106 or the stockroom 108. The first response center 140 located onsite in a backroom may be equipped and staffed with technicians 142 to provide second tier support of a more technical nature. The second response center 150, located offsite with the more robust servers 170 and data storage 172 and staffed with programmers 162, can provide more in-depth third tier support to address more complex issues arising with the robotic unit 100. The product management system 128 can also be configured to analyze and route or direct the problems or issues to the different centers depending on type or level of complexity.

Figure 2:
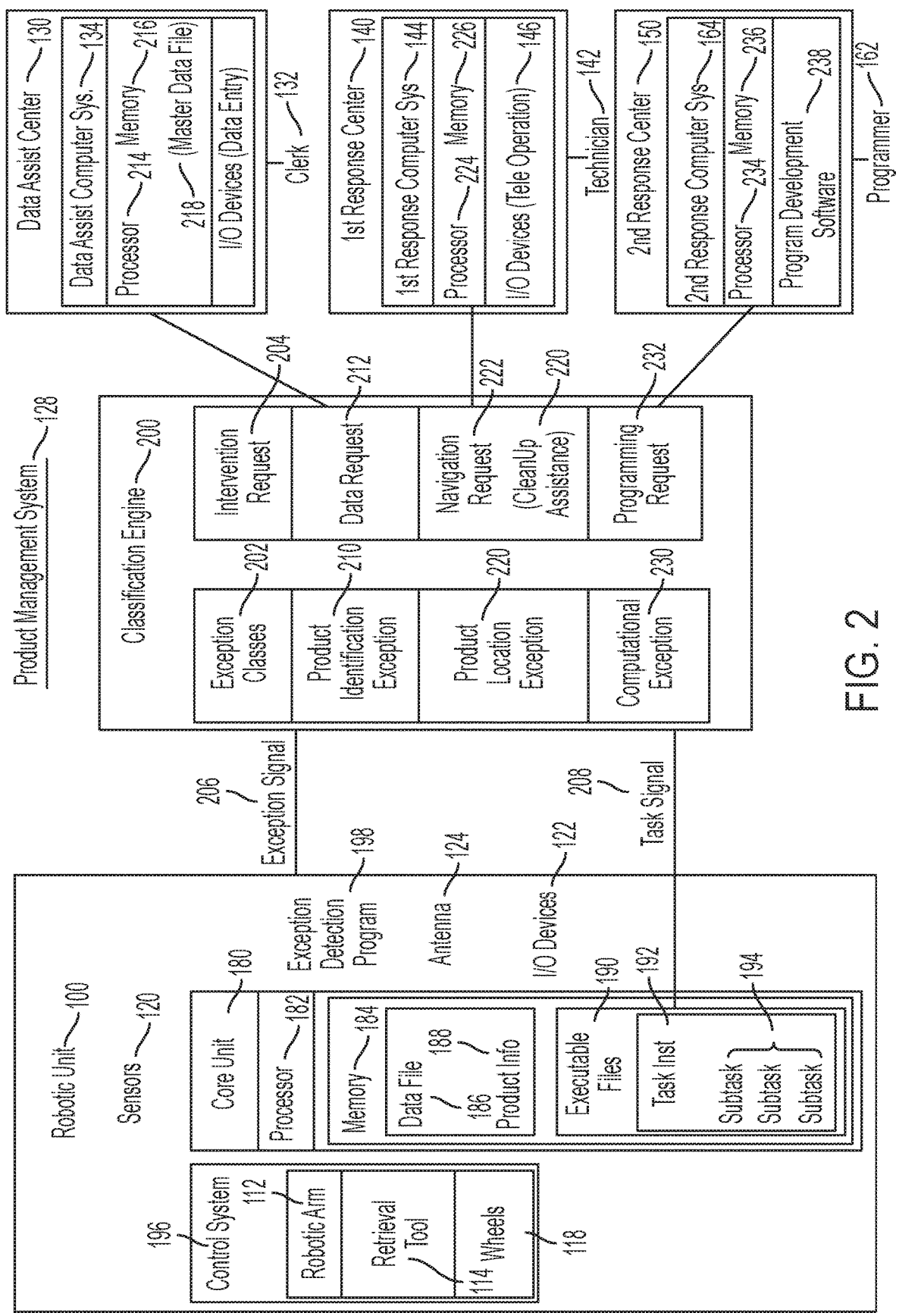
FIG. 2 is a block diagram illustrating a possible example of the architecture of the robotic unit and other computer systems associated with the product management system including possible hardware components, processing capabilities, and communication links.

Referring to FIG. 2, there is illustrated an example of a block diagram representing the product management system 128 having a distributed architecture including a plurality of different centers communicatively linked with the robotic unit 100 to conduct various tasks including handling or manipulation of the products. To store and execute the instructions and code necessary to conduct those tasks autonomously, the robotic unit 100 can have a core unit 180 that includes a processor 182 and memory 184. The processor 182 may be configured as a single integrated electronic chip or integrated circuit although its capabilities may be distributed among a plurality of components. The processor 182 can include circuitry like transistors and resistors for interpreting and processing data and executing instructions in the form of computer executable software written in any suitable programming code. The memory 184 can store the information and instructions to be retrieved by the processor 182 and may be embodied as a semiconductor, integrated circuit, or a readable/writable disk. The memory 184 may be volatile or non-volatile, may be RAM, ROM, EPROM, flash memory, magnetic, optical, or any other suitable form of memory that can be read and written to. The processor 182 and the memory 184 can communicate through a data bus or similar communication links by exchanging electrical signals.

The software, including instructions and data stored in memory 184, can include the information necessary for the robotic unit 100 to autonomously perform tasks assigned to it. The software may be encoded in memory 184 in files or formats to organize and structure the contents. For example, a database or data file 186 can include the software files utilized by the robotic unit 100 in a manner that enables the files to be read from, written to, erased, updated or modified through appropriate programming. The data file 186 may include, for example, product information 188 consisting of information about the different products the robotic unit 100 may interact with in the retail environment. The memory 184 may also include executable files 190 including task instructions 192 that include the machine or processor executable instructions for performing tasks and activities. The task instructions 192 may include multiple subtasks 194 associated with more discrete or individualized actions and operations conducted by the robotic unit 100, such as grasping, lifting, and relocating a product. The memory 184 may include other software such as drivers, libraries, interfaces, and the like.

The processor 182 retrieves and executes the task instructions 192 and other information from the memory 184 to control and manage a control system 196 operatively associated with the various mechanical or electrical systems that enable the robotic unit 100 to maneuver and operate. The control system 196 may include any suitable actuators, motive devices, and feedback sensors including motors, linear actuators, pneumatic actuators, hydraulic actuators, magnetic devices, and the like. The control system 196 can be operatively associated with the robotic arm 112 including the retrieval tool 114 to grasp, lift, and manipulate the products and items. If the robotic unit is a mobile unit, the control system 196 may be operatively associated with the wheels 118 or other devices for locomotion.

The processor 182 may also be in communication with the sensors 120 associated with the robotic unit 100 to receive information about the operative environment and to guide the tasks being conducted. For example, the processor 182 can interpret the visual or sensory data from the sensors 120 to locate and determine information about the product being manipulated by the robotic unit 100. The processor 182 can also process a subprogram, module, algorithm, or routine, referred to herein as an exception detection program 198, to determine if the assigned task can be completed based on the product information, task instructions, and other capabilities of the robotic unit 100. For example, the exception detection program 198 may determine the product is not among the stored product information 188 or is otherwise unrecognizable, or may determine the product is obstructed or misplaced, or may recognize some other error or exception preventing completion of the task. The exception detection program 198 can be encoded as computer executable programming code written and embodied in a non-transient computer readable medium. In another example, the exception detection program 198 and the hardware for executing it can be located remotely from the robotic unit 100 on a remote, stationary computer or computers, which may be the same computers as or different from the computers located at the aforementioned response centers.

To classify or quantify the exception, and to determine the level or type of assistance required from the associated assistants and response centers, the product management system 128 can be operatively associated with a software engine such as a classification engine 200 that generates an output from different inputs. The classification engine 200 can be encoded or embodied as computer executable programing code written and embodied in a transient computer readable medium. The classification engine 200 can be in the form of a subprogram, module, algorithm, or routine for processing, managing, and manipulating information gathered by the robotic unit 100 about the exception or error preventing completion of the task. The classification engine 200 can be implemented as a centralized process on any of the computer systems and/or processors associated with the product management system 128 or its functionality can be disrupted among a plurality of systems and processors. For example, the classification engine 200 may be part of the software residing on the robotic unit 100, residing on the first and/or second response center computers 144, 164, or on other computer systems linked to the network embodying the product management system 128, As a generalized example, the classification engine 200 may classify the exception from among a plurality of exception classes 202 and can generate and output a correlated intervention request 204 for assistance based on the classification. In execution, the classification engine 200 can receive an exception signal 206 from the robotic unit 100, which may be in the form of digital or analog signals transmitted from the transmitter/receiver 124 on the robotic unit or otherwise communicated through the input/output devices 122. The exception signal 206 can be generated by the exception detection program 198 and can include or encode information about the exception determined empirically through the sensors 120 or analytically by the processor 182. In addition to the exception signal 206, the robotic unit 100 may also communicate a task signal 208 identifying the task or the type of task from among the task instructions that the robotic unit is attempting to execute. To classify the exception signal 206 and, if provided, the task signal 208 among the exception classes 202 and to generate and output an appropriate intervention request 204 for assistance or outside intervention, the classification engine 200 may analyze and process the information associated the exception signal 206 and the task signal according to hierarchal tiers or categories. Classification may be based in part upon the staffing and capabilities of the different assistants and response centers networked through the product management system 128.

For example, the classification engine 200 may classify or identify the exception signal 206 as a product identification exception 210 which may represent that the robotic unit 100 is unable to identify the product. A product identification exception 210 may arise when there is insufficient information about the product from among the product information 188 stored in the data file 186 of the robotic unit 100. Further, the robotic unit 100 may not readily recognize the product due to its appearance or the packaging of the product may have changed. A production identification exception 210 may be considered a first tier exception and may be addressed by centers having readily available access to information about the products, such as the clerks 132 associated with the data assistance center 130. Thus, once classified as a product identification exception 210, the classification engine 200 can correlate that classification to the appropriate intervention request 204, which may be a data request 212, and may generate and direct the data request to the data assistance center 130. The data request 212 may be encoded as an electrical signal using any suitable protocol.

Because the data assistance center 130 is located onsite at the retail facility, it may be staffed and equipped to address the first tier data request 212 received from the classification engine 200. For example, the data assistance system 134 associated with the data assistance center 130 can include a processor 214 and memory 216 of any suitable architecture and configuration to search for and identify data responsive to the data request 212. The memory 216 may store a master data file 218 that can include information about all possible products that may be available at the retail facility and that can be routinely updated. Moreover, the clerk 132 or other first tier individuals associated with the data assistance center 130 can assist in the data selection and can complete data entry using the data assistance system 134 to update the product information 188 in the data file 186 of the robotic unit 100. The clerks 132 can also utilize their training to assist in correctly recognizing the product, and their presence onsite and familiarity with the products and their location may facilitate recognition of the product and updating of the product information 188.

The classification engine 200 may also classify the exception signal 206 as a product location exception 220 which may represent that the robotic unit 100 is unable to locate the product or, if located, is unable to manipulate the product due to its location. For example, a product location exception 220 may occur if the product is in a position where it is precarious for the robotic unit 100 to grasp based on the stored task instructions 192 or the product may be obstructed by other objects. A product location exception 220 may be considered a second tier exception that may be addressed by assisting the robotic unit 100 in maneuvering and navigating with respect to the product. Thus, once identified as a product location exception 220, the classification engine 200 can correlate that exception to a navigation request 222 from among the plurality of intervention requests 204. A navigation request 222 may signify that the robotic unit 100 is requesting assistance in navigating itself and/or its robotic arm to the product. The classification engine 200 can generate and output an electronic signal indicative of the navigation request 222 to the first response center 140 located in an office or backroom of the retail facility.

The first response center 140 may be appropriately staffed and equipped to address the second tier navigation request 222 from the classification engine 200. For example, the first response computer system 144 associated with the first response center 140 can have a processor 224, associated memory 226, and the appropriate input/output devices 146 such as a joystick to remotely operate the robotic unit 100 through a teleoperation. Moreover, the technician 142 or other second tier individual at the first response center 140 may be appropriately trained to teleoperate the robotic unit 100 to remotely navigate the robotic unit 100 to the product and to grasp and manipulate the product. For example, the technician 142 can interact with the input/output devices 146 to cause the first response computer system 144 to generate and transmit electronic signals instructing the robotic unit 100 to operate the control system 196 to appropriately actuate, by way of example, the robotic arm 112 and/or the retrieval tool 114 to compete the task. The remote signal may also instruct the control system 196 to actuate the wheels 118 to maneuver around or avoid objects obstructing the products and interfering with the task. Information and data gathered by the sensors 120 on the robotic unit 100 may be communicated to the first response center 140 to assist the technician in teleoperation. During teleoperation, the robotic unit 100 is no longer operating autonomously in accordance with the task instructions 192 but rather functions semi-autonomously or with assisted mobility. As explained below, in an example, the remote instructions from the first response computer system 144 may update the task instructions 192 for future reliance.

In another example, the product location exception 220 may indicate a problem or defect with the product. For example, the product may be damaged due to a spill or puncture. In such an event, the navigation request 222 may include a special request for cleanup assistance 228. The technician 142 operating the first response computer system 144 can then remotely operate the robotic unit 100 to clean up the damaged product or remove the damaged product from the retail facility.

The classification engine 200 may also classify the exception signal 206 as a computational exception 230. A computational exception 230 may occur when the robotic unit 100 has not been adequately programmed to address the assigned task. For example, the robotic unit 100 may encounter a new product for which instructions are not available in the task instructions 192 stored in memory 184. Another example may be where the layout of the retail facility has changed. A computational exception 230 may be considered a third tier exception requiring specialized assistance. To address these exceptions, the classification engine 200 may correlate the computational exception 230 with a programming request 232 signifying the robotic unit 100 requires additional programming assistance to address the new task. The classification engine 200 may generate and communicate electronic signals representative of the programming request 232 to the second response center 150.

The second response center 150 may be properly staffed and equipped to provide third tier assistance in response to the programing request 232 received from the classification engine 200. For example, the second response computer system 164 associated with the second response center 150 can include a processor 234 and memory 236 suitably configured to provide programming services for the generation of new programs and routines to update the task instructions 192. The second response computer system 164 can implement a program development software 238 to assist in the development of new programs and routines to perform the new tasks. The programmers 162 or other third tier individuals staffing the second response center 150 can have the training to develop and implement programs for performing the new tasks. As indicated in FIG. 1, the second response center 150 can also include additional resources such as the robust servers 170 and data storage 172 to facilitate programming the new tasks. In the examples where the second response center 150 is located remotely or offsite and it has access to additional retail facilities 152 and robotic units 154, the second response computer system 164 can utilize information and knowledge obtained from those resources to assist in programming the new tasks. When developed, instructions for executing the new task can be communicated to the task instructions 192 as a new subtask 194 or as a patch or update to the existing subtasks 194.

Figure 3:
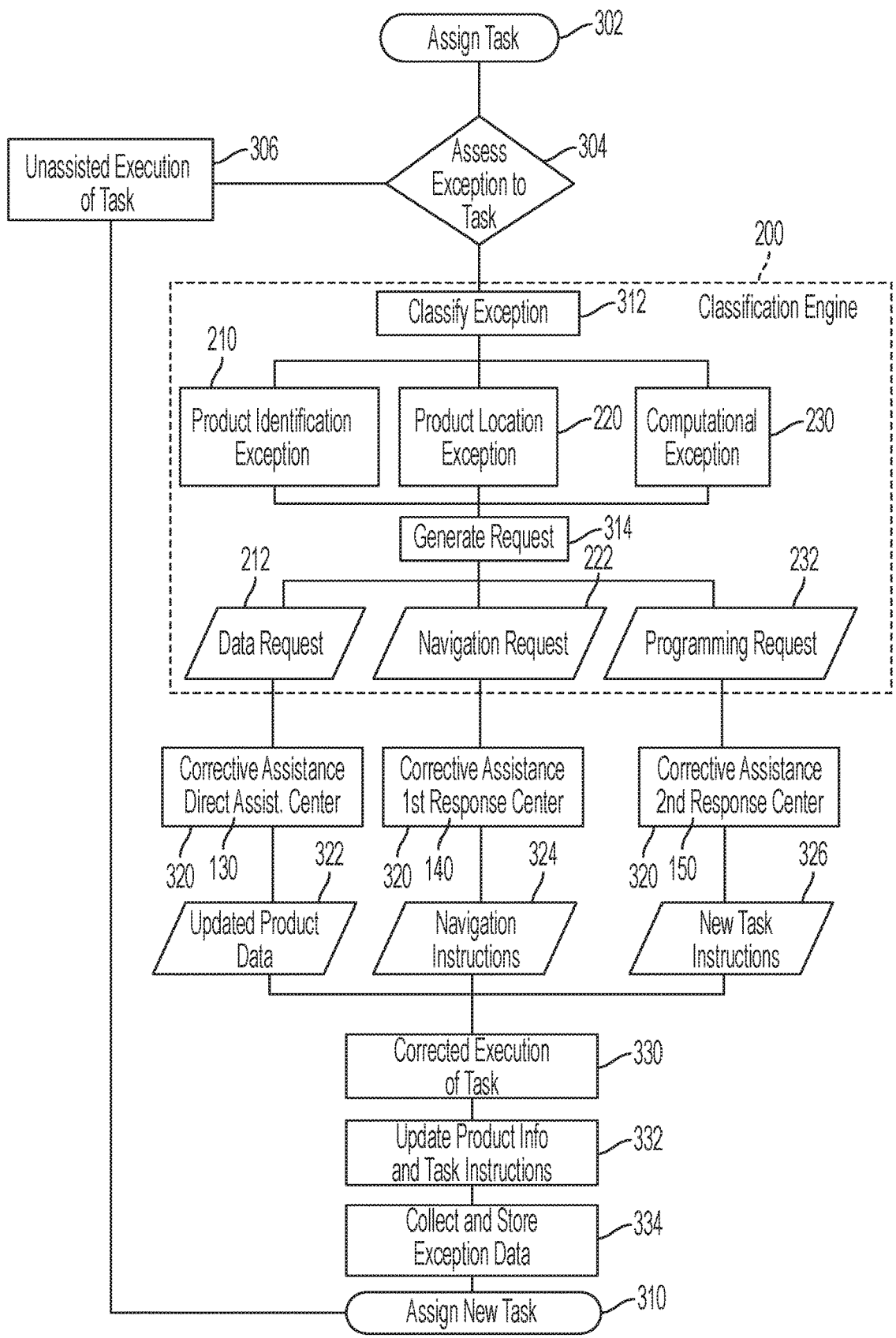
FIG. 3 is a flowchart illustrating a possible example of a process or routine for classifying and addressing an exception that may occur when the robotic unit is unable to perform a task with respect to a product.

Referring to FIGS. 1 and 3, there is illustrated an example of a process 300 in the form of a routine or flowchart by which the robotic unit 100 may execute tasks in conjunction with the product management system 128 providing various types of assistance. The process 300 may be encoded as software including instructions, commands, and data written in computer executable programming code and may be embodied in a centralized or distributed processing environment. The process 300 may be initiated by an assignment step 302 in which a task is assigned to the robotic unit 100. By way of example, the task may be to perform some action with respect to a product 104 in a retail environment, such as to move or relocate the product. The robotic unit 100 may perform an assessment step 304 in which the robotic unit assesses whether it can autonomously perform the task or whether there is an exception that requires assistance. In the example of the robotic unit 100 described above, the assessment step 304 can be performed by the exception detection program. If there is not an exception, the robotic unit 100 may execute an unassisted execution step 306 where the robotic unit autonomously completes the task by executing tasks instructions written in computer executable code and stored in non-transitory memory on the robotic unit. The process 300 can terminate in another assignment step 310 in which the robotic unit 100 is assigned another task.

If the assessment step 304 does register an exception preventing execution of the task, the process 300 can invoke the classification engine 200 to classify the exception and direct an intervention request for the appropriate type or level of assistance. For example, the classification engine 200 in a classification step 312 may classify and output the exception as one of a product identification exception 210, a product location exception 220, or a computational exception 230. The classification step 312 may be performed by any suitable classification or sorting algorithm for organizing and ordering data within a data set. The classification step 312 may rely on comparative analysis, logistical regression, or any other suitable processes or models. The classification step 312 may provide additional classifications associated with different types of exceptions the robotic unit may encounter.

Once the exception is classified, the classification engine 200 can execute a generation and output step 314 in which a correlated intervention request is generated and communicated to the correct recipient. For example, if the classification engine 200 classifies the exception as a product identification exception 210, the generation and output step 314 may generate a first tier data request 212 and direct it to the data assistance center 130 onsite at the retail facility. If the classification engine 200 classifies the exception as a product location exception 220, the generation and output step 314 may generate a second tier navigation request 222 and direct it to the first response center 140 located in an office or backroom of the retail facility. If the classification engine 200 classifies the exception as a computational exception 210, the generation and output step 314 may generate a third tier programing request 232 and direct it to the second response center 150 that may be offsite and remote from the retail facility. The generation and output step 314 may generate additional or different intervention requests in accordance with the different exceptions and classification of those exception as the robotic unit may encounter.

Each of the centers receiving an intervention request may perform a respective corrective assistance step 320 in accordance with their capabilities to provide assistance to the robotic unit 100 in performing the task. For example, the data assistance center 130 may identify the product and the clerk associated with the data assistance center 130 may provide updated product data 322 to the robotic unit 100. The first response center 140 may remotely communicate with the robotic unit 100 and the technician can interact with and teleoperate the robotic unit remotely through the exchange of navigation instructions 324. The programmers at the second response center 150 may develop or program new task instructions 326 for performing a new task with respect to the product and/or robotic unit. The corrective assistance may be communicated from the respective assistance center or response center to the robotic unit by any suitable communication method.

In a corrected execution step 330, the robotic unit 100 can receive the corrective assistance and attempt to complete the assigned task in accordance with the provided corrective assistance. It will be appreciated that the process of requesting intervention and receiving corrective assistance may occur though several iterations, for example, through iterative loops, until the task is compete. Once completed, the robotic unit 100 may conduct an updating step 332 in which the instructions, commands, or data received through the corrective assistance is saved in the memory associated with the robotic unit. For example, referring to FIGS. 2 and 3 if the robotic unit receives updated product data 322, the product information 188 may be updated in the data file 186 for future reference. If the robotic unit 100 receives navigation instructions 324, the task instructions 192 can be updated or modified as appropriate. If the robotic unit 100 receives new task instructions 326, those can be added to the plurality of subtasks 194 maintained in memory associated with the robotic unit. In another possible step, the routing 300 may collected and store exception data 334 about the encounter including the exception classification, the generated intervention request, and the corrected execution of the task for further use and analysis.

Accordingly, a possible advantage of the disclosure is that the robotic unit 100 can be trained to reuse the corrective assistance received from the centers to perform future tasks. Another possible advantage is that, by classifying exceptions, resources and staffing at the assistance and response centers is accurately allocated to assisting the robotic unit with appropriately suited tasks. Another possible advantage is that the robotic unit may receive tiered human assistance in performing tasks and utilize that assistance as training in performing future tasks.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A product management system comprising:
    a robotic unit including a processor, memory, and a product manipulation tool configured to execute a task with respect to a product;
    a data assistance center having a data assistance system storing product information;
    a first response center including a first response computer system with input/output devices for teleoperation of the robotic unit;
    a second response center including a second response computer system with program development software; and
    a classification engine configured to analyze and process information associated with an exception signal indicating the robotic unit cannot complete the task and to classify the exception signal as one of (i) a product identification exception, (ii) a product location exception and (iii) a computational exception;
    the classification engine further configured to direct an intervention request to one of the data assistance system, first response computer system, and the second response computer system based on the classification.

2. The product management system of claim 1, wherein the robotic unit further comprises a data file including product information about the product and an executable file including task instructions to execute the task.

3. The product management system of claim 2, wherein the classification engine generates a data request to the data assistance system in response to a product identification exception.

4. The product management system of claim 3, wherein the robotic unit updates the data file with updated product data from the data assistance system.

5. The product management system of claim 2, wherein the classification engine generates a navigation request to the first response system in response to a product location exception.

6. The product management system of claim 5, wherein the robotic unit updates the task instructions with navigation instructions from the first response center.

7. The product management system of claim 2, wherein the classification engine generates a programing request to the second response system in response to a computational exception.

8. The product management system of claim 7, wherein the robotic unit updates the task instructions with a new task instruction from the second response center.

9. The product management system of claim 2, wherein the robotic unit and the product are located at a retail facility.

10. The product management system of claim 9, wherein:
    the data assistance system is onsite at the retail facility;
    the first response computer system is located onsite at the retail facility;
    the second response system is located offset and remote from the retail facility.

11. The product management system of claim 1, wherein the robotic unit further includes an exception detection program for registering an exception that the robotic unit cannot complete the task and for generating the exception signal.

12. The product management system of claim 1, wherein the robotic unit includes wheels for mobility, a sensor for gathering information, and the product manipulation tool is a robotic arm.

13. A method of managing products comprising:
 directing a robotic unit to autonomously execute a task with respect to a product;
 registering an exception indicating the robotic unit cannot complete the task;
 analyzing and processing information associated with the exception and, as a result, classifying the exception as one of (i) a product identification exception, (ii) a product location exception, and (iii) a computational exception; and
 generating and directing an intervention request to one of (i) a data assistance center; (ii) a first response center; and (iii) a second response center based on the classification.

14. The method of claim 13, further comprising receiving updated product information from the data assistance center and updating product information maintained in memory of the robotic unit.

15. The method of claim 13, further comprising receiving navigation instructions from the first response center and updating task instructions maintained in memory of the robotic unit.

16. The method of claim 13, further comprising receiving new task instructions from the second response center and storing the new task instructions in memory of the robotic unit.

17. The method of claim 13, wherein the intervention request is correlated such that:
 the product identification exception corresponds to a data request to the data assistance center;
 the product location exception corresponds to a navigation request to the first response center; and
 the computational exception corresponds to a programming request to the second response center.

18. The method of claim 13, wherein:
 the data assistance center is located onsite with the robotic unit;
 the first response center is located onsite with the robotic unit; and
 the second response center is located offsite and remote from the robotic unit.

19. A classification engine embodied in a non-transitory computer readable medium having computer executable software code that if executed by one or more processors classifies and addresses an exception comprising the steps of:
 receiving an exception signal indicating that a robotic unit cannot complete a task with respect to product;
 analyzing and processing information associated with the exception signal and, as a result, classifying the exception signal as at least one of (i) a product identification, (ii) a product location exception, and/or (iii) computation exception;
 directing a data request corresponding to the product identification exception to a data assistance center having product information;
 directing a navigation request corresponding to the product location exception to a first response center having teleoperation capabilities to remotely operate the robotic unit; and
 directing a programming request to a second response center having programming capabilities to program the robotic unit.

20. The classification engine of claim 19, wherein the classification engine resides in non-transitory memory on the robotic unit.

* * * * *